US008462476B2

(12) United States Patent  (10) Patent No.: US 8,462,476 B2
Marmonier  (45) Date of Patent: Jun. 11, 2013

(54) METHOD AND APPARATUS FOR PROVIDING DIFFERENTIAL PROTECTION FOR AN ELECTRICAL LINK IN A MEDIUM, HIGH, OR VERY HIGH VOLTAGE NETWORK

(75) Inventor: Jean Marmonier, Saint Aunis (FR)

(73) Assignee: Areva T&D Protection & Controle, Lattes (FR)

( * ) Notice: Subject to any disclaimer, the term of this patent is extended or adjusted under 35 U.S.C. 154(b) by 59 days.

(21) Appl. No.: 12/994,450

(22) PCT Filed: May 29, 2009

(86) PCT No.: PCT/EP2009/056590
§ 371 (c)(1),
(2), (4) Date: Nov. 23, 2010

(87) PCT Pub. No.: WO2009/147078
PCT Pub. Date: Dec. 10, 2009

(65) Prior Publication Data
US 2011/0069421 A1 Mar. 24, 2011

(30) Foreign Application Priority Data
Jun. 2, 2008 (FR) .................................... 08 53610

(51) Int. Cl.
*H02H 3/00* (2006.01)
(52) U.S. Cl.
USPC .......................................................... 361/85
(58) Field of Classification Search
USPC .............................. 361/85, 83, 78, 66, 64, 62
See application file for complete search history.

(56) References Cited

U.S. PATENT DOCUMENTS

| 4,851,782 | A | * | 7/1989 | Jeerings et al. | ............... 324/520 |
| 5,267,231 | A | | 11/1993 | Dzieduszko | |
| 2003/0058594 | A1 | * | 3/2003 | Kerger et al. | ................... 361/80 |
| 2007/0086134 | A1 | * | 4/2007 | Zweigle et al. | ................. 361/85 |
| 2007/0177319 | A1 | * | 8/2007 | Hirst | ............................... 361/85 |
| 2008/0137246 | A1 | | 6/2008 | Oda | |

FOREIGN PATENT DOCUMENTS

| EP | 1195876 A2 | 4/2002 |
| JP | 08 037724 A | 2/1996 |
| JP | 2008125251 A | 5/2008 |

OTHER PUBLICATIONS

International Preliminary Report on Patentability in International Application No. PCT/EP2009/056590, mailed Feb. 17, 2011.
International Search Report, PCT/EP2009/056590, dated Aug. 28, 2009.
French Preliminary Search Report, FR 08 53610, dated Dec. 11, 2008.

* cited by examiner

*Primary Examiner* — Stephen W Jackson
(74) *Attorney, Agent, or Firm* — Nixon Peabody LLP (57) ABSTRACT

A method and a differential protection apparatus for an electrical link in a medium, high or very high voltage power distribution network. This method, in which two differential protection devices are disposed at the two ends (A, B) of said link, includes a step during which a comparison is made between the current measured locally and the current measured remotely, after said devices have been resynchronized by phase shifting the data received from the end situated remotely by one half of the sum of the outward and return propagation times; and a second step during which, if an angular phase difference is found to exist between two currents after resynchronization, automatic compensation is effected by servocontrolling the angle of the current vectors.

11 Claims, 7 Drawing Sheets

METHOD AND APPARATUS FOR PROVIDING DIFFERENTIAL PROTECTION FOR AN ELECTRICAL LINK IN A MEDIUM, HIGH, OR VERY HIGH VOLTAGE NETWORK

CROSS REFERENCE TO RELATED APPLICATIONS OR PRIORITY CLAIM

This application is a national phase of International Application No. PCT/EP2009/056590, entitled "METHOD AND SYSTEM FOR THE DIFFERENTIAL PROTECTION OF AN ELECTRICAL LINK IN A MEDIUM-VOLTAGE, HIGH-VOLTAGE OR VERY HIGH-VOLTAGE NETWORK", which was filed on May 29, 2009, and which claims priority of French Patent Application No. 08 53610, filed Jun. 2, 2008.

DESCRIPTION

1. Technical Field

This invention relates to a method and to an apparatus for providing differential protection of a single-phase, two-phase, or three-phase electrical link, for example an overhead power line, a cable, or an underground cable, in a medium voltage, high voltage, or very high voltage network.

The description below relates to a three-phase network having three phases A, B, and C, with a view to keeping the description as simple as possible.

2. Current State of the Prior Art

The document having the reference [1] at the end of this description describes an electricity network that includes differential protection apparatus with protective relays situated at both ends of a section of power line. Analog data (namely the sinusoidal waves or curves of the input currents to the link), measured at each end of said section, are sampled, digitally encoded, multiplexed, and transmitted to the other end of the section, where they are decoded and compared with the data obtained locally. The circuit breakers at each end of the link are tripped by the devices at the ends A and B if the difference between the local data and the remote data exceeds a predetermined value.

The reading of the electrical data at both ends of the line section must be synchronized in order that any operating fault, for example a short circuit, can be detected. The differential protection devices, or relays, situated at said two ends A and B carry out a dialogue with each other by exchanging information. Each of those devices makes use of a calculation program in order to compare, at any given moment, the data measured locally with the data transmitted by the other device that is situated remotely. In this way they perform a comparison between the data taken at one end A with the data taken at the other end B. They must take into account the time taken by the data to propagate over the link 7, which becomes a time offset, i.e. a phase difference, between the current curves.

Figure 1:
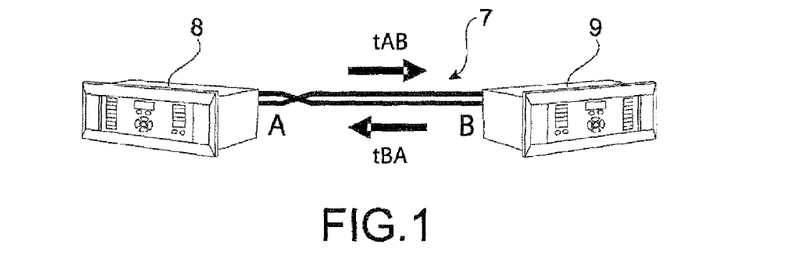
FIG. 1 shows a connecting link between a first differential protection device and a second differential protection device, with an outward propagation time tAB and a return propagation time tBA.

As shown in FIG. 1, a first prior art method of correcting the errors in synchronization due to this time offset consists in measuring the time taken by one of the readings, taken by a device 8 situated at the end A of the link 7, to reach a device 9 situated at the other, or remote, end B and then to return; measurement of the propagation time tAB from the end A to the end B, and the propagation time tBA from the end B to the end A, is not possible because of the lack of synchronization referred to above. In that first method, it is assumed that the propagation time tAB and the propagation time tBA are equal. The signal received from the remote end B is phase shifted by one half of the sum of the outward and return propagation times, that is to say:

$$tp=(tAB+tBA)/2.$$

This first method works well when the propagation time tAB is indeed equal to the propagation time tBA, for example tAB=tBA=6 milliseconds (ms), so that tp=6 ms.

Figure 2:
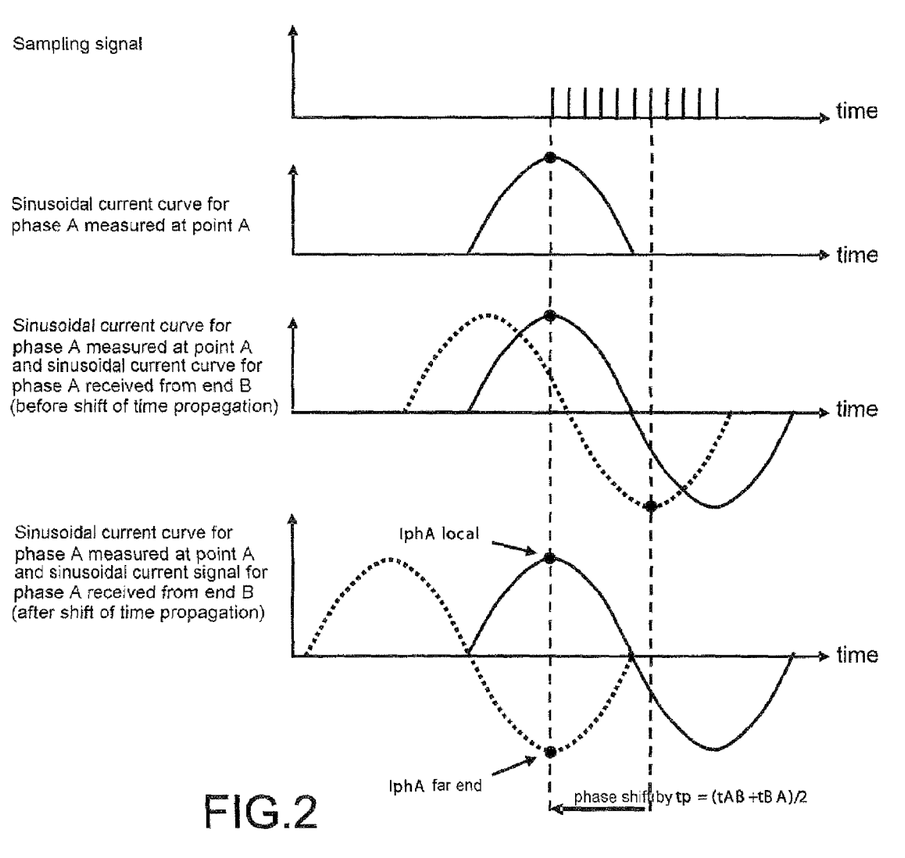
FIGS. 2, 3A and 3B illustrate circumstances in which the phase shifting of the sinusoidal curve of the currents at the level of the first differential protection device, by applying the first method of the prior art, is correct.
Figure 3A:
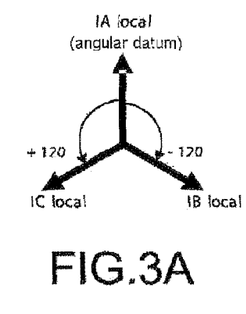
Figure 3B:
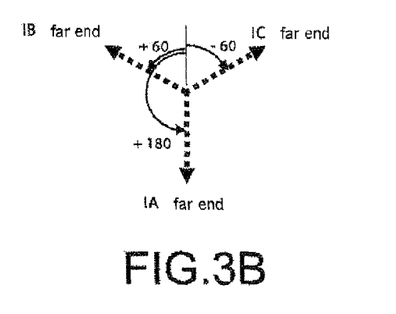

As is shown in FIGS. 2, 3A, and 3B, in the event of equality between these propagation times, the phase shift of the sinusoidal curves of the currents received from the end B is then correct for the device at the end A. FIG. 2 shows a current curve measured at the end A (in continuous lines) and a current curve received at the end B and phase shifted by the time tp (in broken lines). FIGS. 3A and 3B show the Fresnel diagrams of the currents IA, IB, and IC for the three phases A, B, and C.

Figure 4:
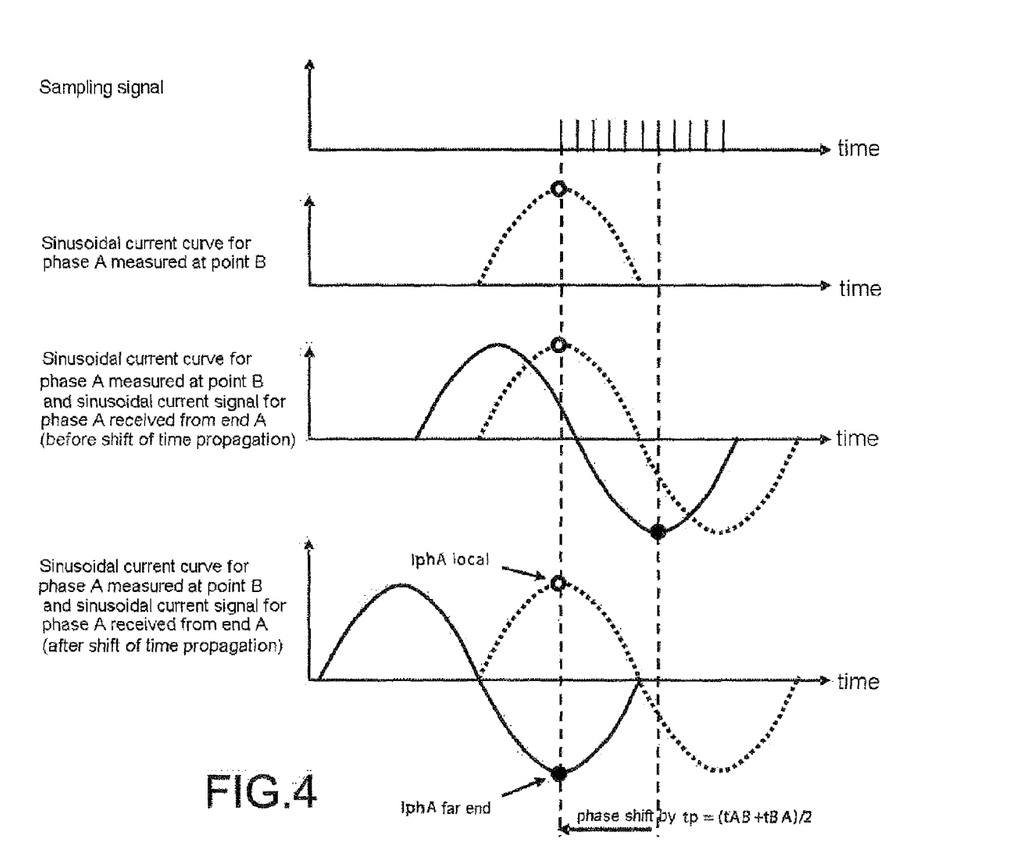
FIGS. 4, 5A and 5B illustrate circumstances in which the phase shifting of the sinusoidal curve of the currents at the level of the second differential protection device, by applying the first method of the prior art, is correct.
Figure 5A:
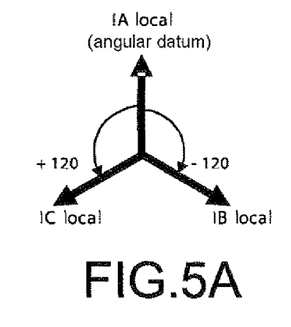
Figure 5B:
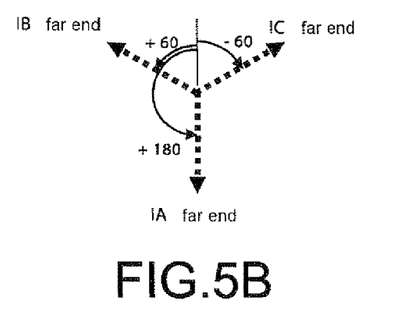

Similarly, and as shown in FIGS. 4, 5A, and 5B, the shifting of the current curves is correct for the device situated at the end B: FIGS. 4, 5A, and 5B should be compared with FIGS. 2, 3A, and 3B respectively.

Figure 6:
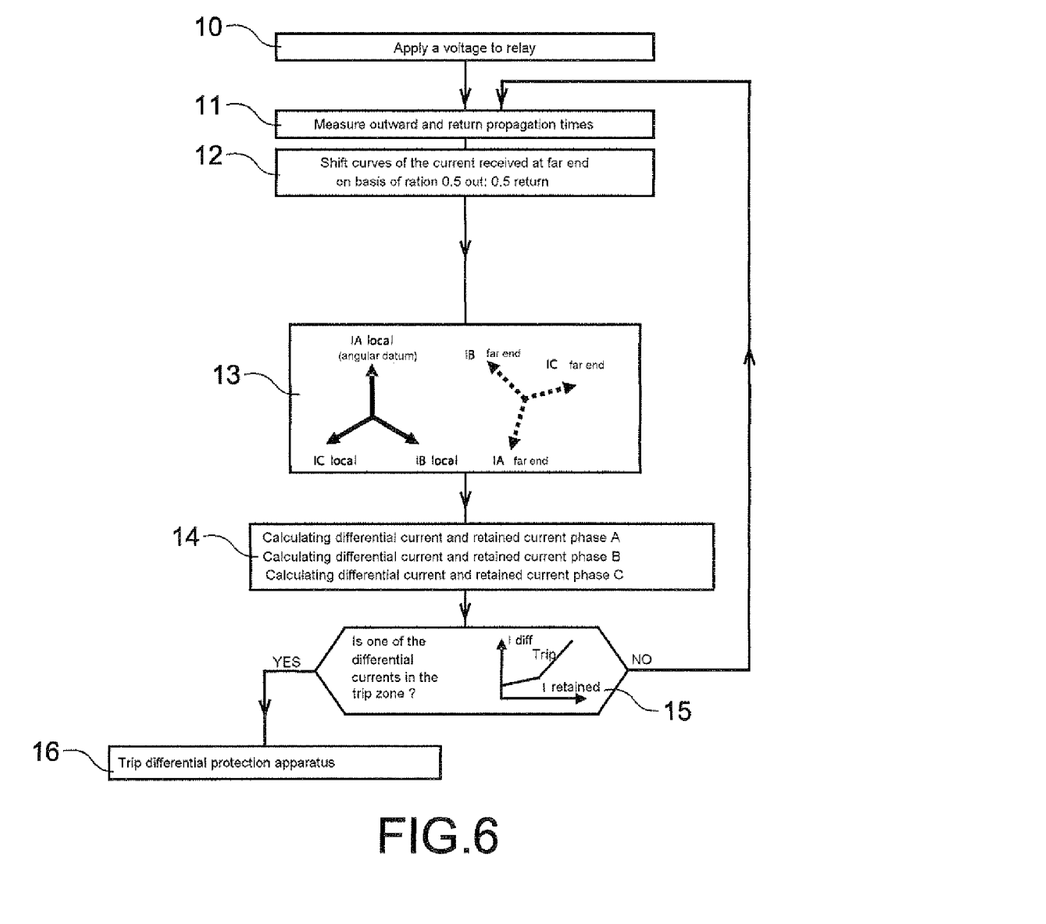
FIG. 6 is a process diagram illustrating the operation of a differential protection device in the prior art.

FIG. 6 is a flow chart showing such a method of operation of the differential protection devices with that first method of measuring the outward and return propagation times.

Accordingly, FIG. 6 shows the following steps:

applying a voltage to the relay (step 10);

measuring the outward and return propagation times (step 11);

phase shifting the curves of the current received from the far end on the basis of the ratio of 0.5 outward:0.5 return (step 12);

obtaining the Fresnel diagrams of the currents (step 13);

calculating the differential current and the retained current for the three phases A, B, and C (step 14);

testing to find out whether one of the differential currents is in the trip zone (step 15), with a loop back to before step 11 if the response is negative; and tripping the differential protection apparatus (step 16).

That first method does not work well when the outward propagation time is different from the return propagation time, for example if tAB=4 ms, tBA=8 ms, so that tp=6 ms.

Figure 7:
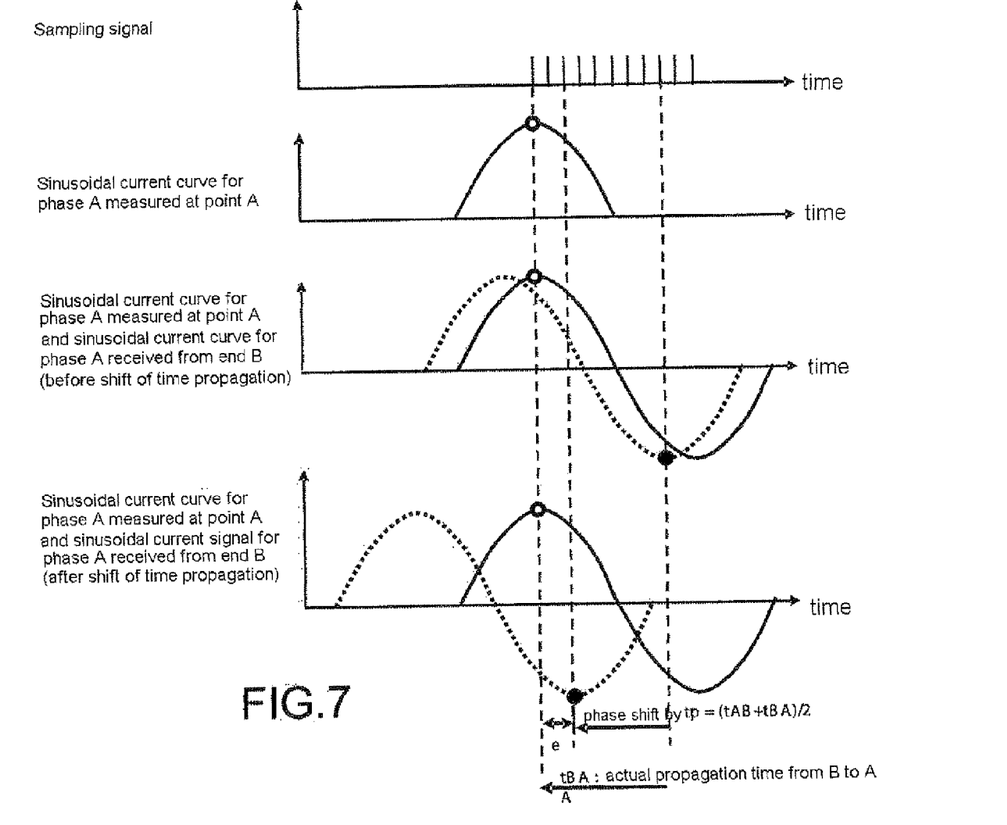
FIGS. 7, 8A and 8B illustrate circumstances in which the phase shifting of the sinusoidal curve of the currents at the level of the first differential protection device, by applying the first method of the prior art, is erroneous.
Figure 8A:
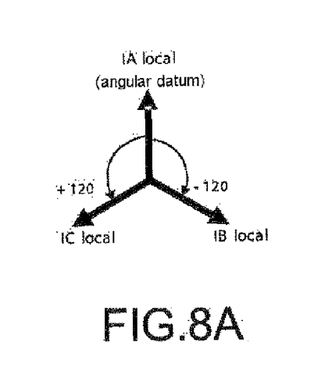
Figure 8B:
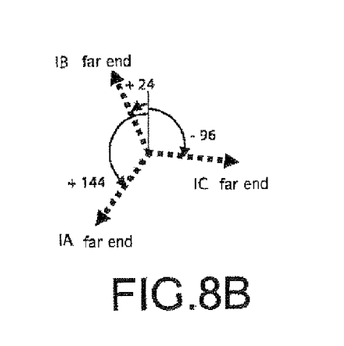

As is shown in FIGS. 7, 8A, and 8B, a phase-shift error e of the current curves appears in one direction for the device situated at the end A. This error e is 2 ms, which corresponds to an angular offset of −36°.

Figure 9:
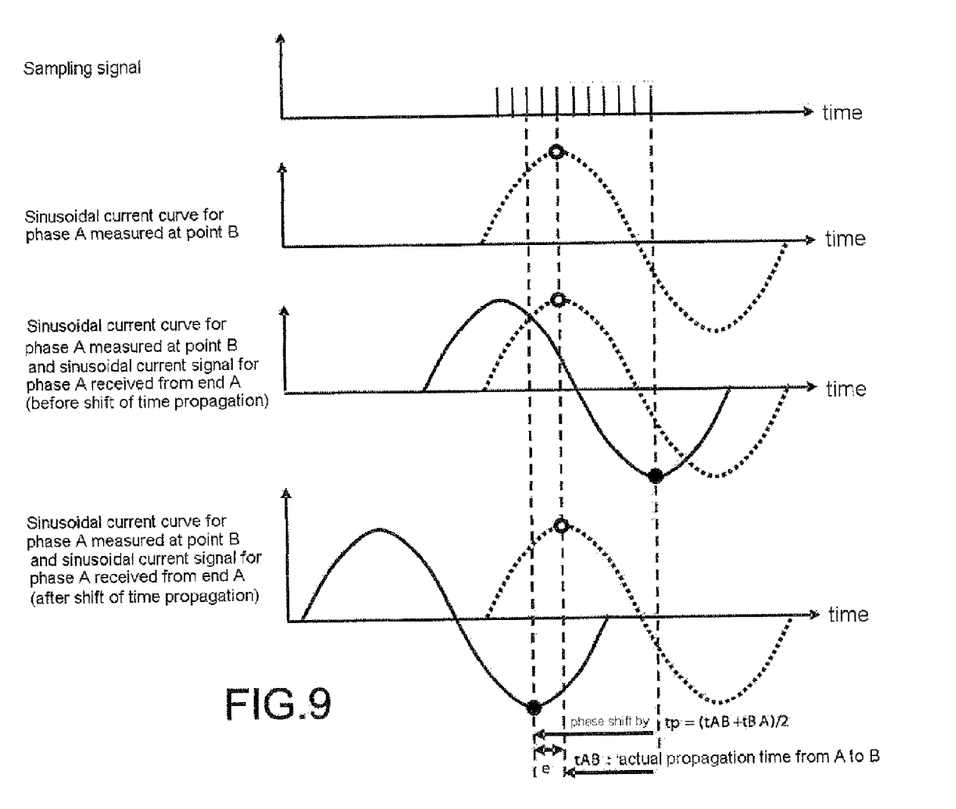
FIGS. 9, 10A and 10B illustrate circumstances in which the phase shifting of the sinusoidal curve of the currents at the level of the second differential protection device, by applying the first method of the prior art, is erroneous.
Figure 10A:
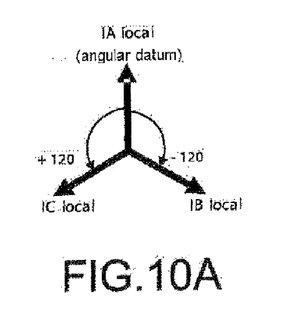
Figure 10B:
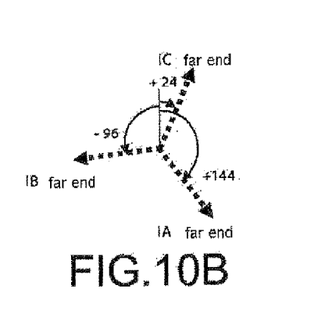

Similarly, as shown in FIGS. 9, 10A, and 10B, a phase shift error in the current curve appears in the other direction for the device 9 situated at the end B.

Thus, in the event of a difference between the outward and return propagation times, an error is introduced that may result in improper tripping of the protective apparatus for a fault outside the link, or in failure of an alarm that should warn the operator that there is a communication problem.

As is shown in FIGS. 8A, 8B and 10A, 10B, this error is shown in the Fresnel diagram as an angular offset between the vector of the locally measured current and the vector of the current that is received from the other end and incorrectly phase shifted. This angular phase difference is a function of the difference between the outward and return propagation times and the frequency of the network.

In order to permit correct operation of differential protective devices in the event of inequality between the outward and return propagation times, there does exist a second method of correction in the prior art, which second method makes use of synchronization of the protective devices by external means, for example a GPS clock. Accordingly, the document with the reference [2] at the end of this description describes a protective relay apparatus in a power transmission system, which apparatus is capable of monitoring a plurality of relays at the same instant, those relays working independently of each other, by making use of a signal from a GPS satellite, the instants at which the monitoring measurements are taken being made to be identical without any need to worry about transmission delay times.

However, that second method does have a major drawback, which is that any loss in transmission of the data signals between the protective relays installed in the electricity network and the GPS system will lead to total loss of the function of protection of the power network. In addition, that second method has disadvantages in terms of equipment and installation costs, and it tends to reduce the availability and the reliability in operation of the protection.

An object of the invention is to replace the approximate synchronization of the first method with synchronization by servocontrolling the angle of the current vectors received from the remote measurement, not on the basis of the assumption that the outward propagation time and the return propagation time are equal, but rather on the basis that in nominal working, the current curves measured locally, and the current curves received from the far end measurement, are necessarily synchronized, because these current curves are essentially identical in amplitude and phase; a further object is to improve the accuracy of the analysis that is carried out, in order to discriminate between various fault situations, whereby to avoid any untoward tripping of a protective device or relay.

SUMMARY OF THE INVENTION

The invention provides a method of protecting an electrical link in a medium, high, or very high voltage network, in which two differential protection devices are disposed at both ends of said link, said method being characterized in that it includes the following steps:

apply a voltage to the relay;
measure the outward-and-return propagation time;
phase shift the sinusoidal curves of the current received from the far end, on the basis of the ratio 0.5 outward/0.5 return; and
first test to find out whether a determined time has elapsed;
1) If Result of this First Test is Negative
phase shift the sinusoidal curves of the current received from the far end, on the basis of the ratio 0.5 outward/0.5 return;
obtain Fresnel diagrams for the current without servocontrolling the phases at the far end;
calculate the differential current and the retained current for each phase;
second test to find out whether one of the differential currents is in the trip zone;
trip the differential protection apparatus if result of this second test is positive;
2) If Result of this First Test is Positive and if Result of the Second Test is Negative:
Test to compare the phase difference $\Delta\Phi$ between the locally measured current and the current measured remotely, for each phase, with at least one determined value, and optional servocontrol of the phase of each end current at 180° relative to each corresponding local current.

Advantageously, the first test serves to find out whether with a two-phase or three-phase network, the current in each of the phases of the network is found to be out of phase, said compensation being effected only after a predetermined time delay, which may be of the order of 100 ms.

Advantageously, the first test serves to find out whether an insulation fault is detected. An alarm is generated if said compensation reaches a first predetermined level. A second alarm is generated, and the protection apparatus is blocked, when the compensation reaches a second predetermined level that is considered unacceptable.

The invention also provides differential protection apparatus for an electrical link in a medium, high, or very high voltage network, said apparatus including two differential protection devices disposed at respective ends of said link, together with means for re-synchronizing said devices by phase shifting the data received from the end of the link situated remotely, by one half of the sum of the outward and return propagation times, the apparatus being characterized in that it further includes means for automatic compensation by servocontrolling the angle of the current vectors.

Advantageously, the apparatus further includes means for calculating the phase difference between the currents on each phase of said network, and/or means for taking into account a predetermined time delay, which is for example of the order of 100 ms.

Advantageously, the apparatus also includes means for detecting an insulation fault, together with blocking means and means for generating an alarm.

The method and apparatus of the invention have, in particular, the following advantages:

They enable the protective devices to be synchronized when the outward propagation time is not equal to the return propagation time, without making use of an external synchronizing network.

A deterioration in the propagation time, after a period in which the outward propagation time was identical to the return propagation time, results in compensation that enables the network to work once again under optimum conditions.

They are applicable for differential protection apparatus that is either single phase (comparison of the homopolar current measured at each end), or two phase, or three phase.

DETAILED DESCRIPTION OF THE PARTICULAR EMBODIMENTS

The method of the invention consists in synchronizing the sinusoidal curves of the currents that are measured locally, with the sinusoidal curves of the currents received from the far end of a link, by servocontrolling the current vectors. In this regard, these current curves, as measured locally, and the current curves as received from the remote measuring device at the far end, are necessarily to be synchronized with each other because they are effectively identical both in amplitude and in phase.

Accordingly, the method of the invention comprises the following steps:

In a first step, the outward and return propagation times are taken to be related by coefficients of 50%-50%: the differential protection devices 8 and 9 are then resynchronized by use of the first method of the prior art, by phase shifting the data received from the far end by one half of the sum of the outward and return propagation times;

Then, in a second step, if an angular phase difference is found to exist in the currents of each phase after resynchronization, this phase difference is corrected by servocontrolling the remote current vectors IA, IB and IC to 180° relative to the local current vectors IA, IB and IC: for example this can give coefficients of 40% for the outward time and 60% for the return. In this way, the curves of local current and remote current are synchronized, since in nominal working they are in strict synchronism; the current at one end of the link is synchronous with the current at the other end providing the effect of capacitive current in the link can be ignored.

The method of the invention mitigates the disadvantages of GPS synchronization, such as that used in the second method of the prior art, by replacing GPS synchronization with synchronization of the sinusoidal current curves that are available without any additional cost at each end A and B of the link.

It should be noted that this synchronization is possible for the currents but not for the voltages of the network, which voltages may be more substantially out of phase than the currents between the two ends A and B of a link.

In order to avoid the application of compensation when the phase difference between the current measured locally and the current received from the far end is due to the application of an insulating fault in the section of the link being protected, this compensation is only carried out if the following three conditions are satisfied.

1. Compensation is only carried out if a current phase difference of the same value is found in all of the phases A, B, and C of the network: a fault that varies slowly is, in the great majority of circumstances, a fault in only one phase. It should be noted that a difference between the outward and return times always introduces a phase difference in all three phases.

2. The compensation is only applied after a predetermined time delay, for example of the order of 100 ms: the compensation is not instantaneous in order to enable a fault to be detected that introduces a phase difference on all three phases A, B, and C without influencing the measurement taken.

3. The compensation is not carried out if an insulation fault is detected: a conventional method of detecting a fault of this kind may for example consist in measuring the homopolar current or the inverse current.

These three conditions make it possible to avoid carrying out compensation in the event of a resistive fault which, by developing slowly, introduces a phase difference for which the protection device could compensate permanently to the point of reducing the sensitivity of detection.

In addition, a time constant, of about 0.5 s, can be introduced at will into the control function, with a view to carrying out no compensation in the event of a fault appearing in the power link.

Figure 11A:
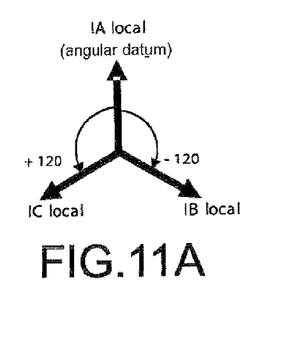
FIGS. 11A, 11B and 11C illustrate the operation of the method of the invention at the first differential protection device.
Figure 11B:
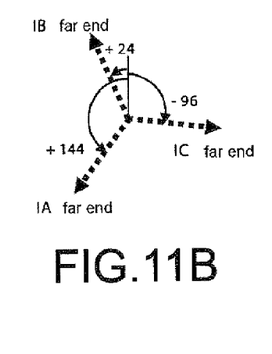
Figure 11C:
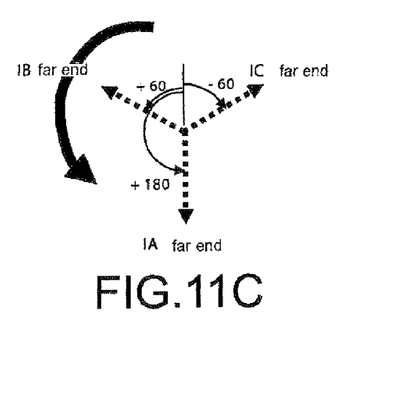
Figure 12A:
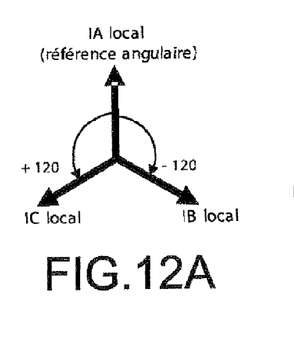
FIGS. 12A, 12B and 12C illustrate the operation of the method of the invention at the second differential protection device.
Figures 12B, 12C:
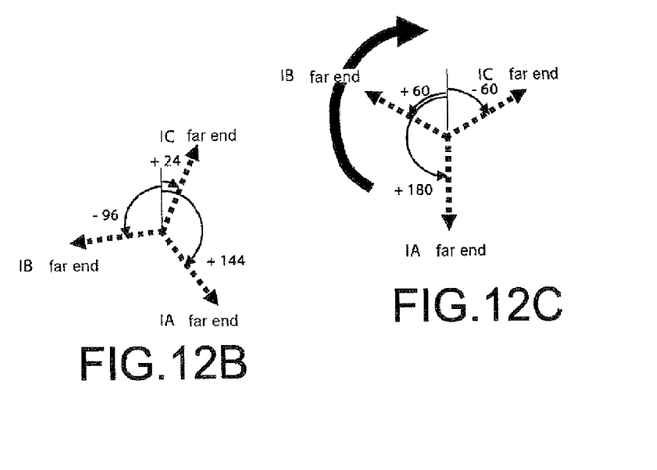

FIGS. 11A and 11B (and FIGS. 12A and 12B respectively) illustrate an error of alignment in the current vectors of the Fresnel diagram due to the difference in propagation times at the end A (or the end B, respectively), while FIG. 11C (and FIG. 12C, respectively) illustrate the realignment of the vectors obtained with the method of the invention.

When the angular compensation that is needed becomes too great, the protection apparatus may be blocked at the operator's choice, and an alarm may be generated, also at the operator's choice, to indicate to the operator that some excessive fault exists in regard to propagation times.

The risk of carrying out angular compensation while there is a phase difference linked to the occurrence of a very strong, and developing, fault that is capable of upsetting the detection of the fault, is virtually non-existent in high voltage and very high voltage networks, because strong faults do not introduce any angular phase difference between the currents, and will therefore not cause compensation to take place (the network being in a neutral state, directly connected to ground). In addition, this risk is eliminated due to the three precautions described above.

Figure 13:
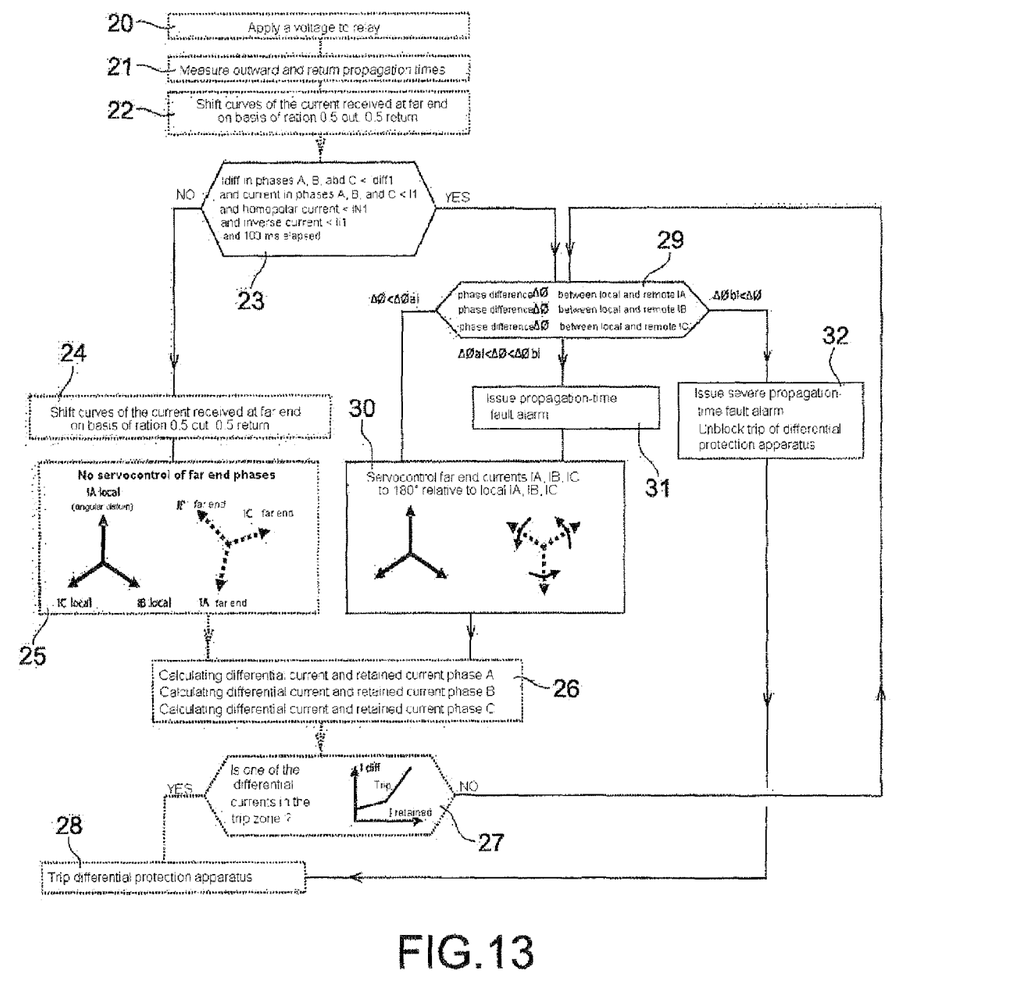
FIG. 13 is a process diagram illustrating the operation of the method of the invention.

FIG. 13 is a flow chart showing the operation of the method of the invention.

The parts of the figure in broken lines correspond to the operation of the differential protection apparatus of the prior art that is illustrated in FIG. 6.

FIG. 13 shows the following steps:

Apply a voltage to the relay (step 20).

Measure the outward-and-return propagation time (step 21).

Phase shift the sinusoidal curves of the current received from the far end, on the basis of the ratio 0.5 outward:0.5 return (step 22).

Test to find out whether the following relationships are satisfied (step 23):

Idiff phases A, B, and C<Idiff 1
and
current phases A, B, and C<I1
and
homopolar current<IN1
and
inverse current<Ii1
and
a time of 100 ms has elapsed.

(1) If Result of Test 23 is Negative:

Phase shift the sinusoidal curves of the current received from the far end, on the basis of the ratio 0.5 outward:0.5 return (step 24).

Obtain Fresnel diagrams for the current without servocontrolling the phases at the far end (step 25).

Calculate the differential current and the retained current for phases A, B and C (step 26).

Test to find out whether one of the differential currents is in the trip zone (step 27).

Trip the differential protection apparatus if result is now positive (step 28).

(2) If Result of Test 23 is Positive and if Result of Test 27 is Negative:

Test to find out whether the phase difference $\Delta\Phi$ between Ilocal and Iremote, for each phase, is less than a value $\Delta s\Phi a1$, or a value $\Delta\Phi b1$, or lies between these two values (step 29).

Then;

(a) If $\Delta\Phi<\Delta\Phi a1$:

The phase of the remote currents IA, IB, and IC is servocontrolled so as to be 180° relative to local currents IA, IB and IC (step 30), and this is followed by above step 26.

(b) If $\Delta\Phi a1<\Delta\Phi<\Delta\Phi b1$:

An alarm is issued to warn of a propagation time fault (step 31), followed by the above servocontrol step 30.

(c) If $\Delta\Phi b1<\Delta\Phi$:

An alarm is issued to warn of a serious propagation time fault and unblock the tripping means of the differential protection device (step 32), followed by step 28 of tripping the differential protection device.

The threshold values used are as follows:

$\Delta\Phi a1$: a phase difference above this threshold value generates an alarm indicating an abnormally high discrepancy between the outward and return propagation times.

$\Delta\Phi b1$: a phase difference above this threshold value generates an alarm indicating an unacceptable discrepancy between the outward and return propagation times, and involves blocking the tripping means of the differential device.

Idiff1: if the differential current (I local+I remote)/2 is above this threshold value, then the servocontrolling the phases of the currents received from the far end does not take place.

I1: if the phase current Ilocal is above this threshold value, then the servocontrol of the phases of the currents received from the far end does not take place. This criterion enables a three-phase insulation fault to be detected.

IN1: if the residual (homopolar) current is above this threshold value, then the servocontrol of the phases of the currents received from the far end does not take place. This criterion enables a phase-to-ground insulation fault to be detected.

Ii1: if the inverse current is above this threshold value, then the servocontrol of the phases of the currents received from the far end does not take place. This criterion enables a phase-to-phase insulation fault to be detected.

The values used in the above description correspond to the values actually found on links The propagation times are times that are typically encountered in communication via a multiplexer.

REFERENCES

[1] U.S. Pat. No. 5,267,231
[2] EP 1 195 876

The invention claimed is:

1. A method of protecting an electrical link in a medium, high, or very high voltage network, in which two differential protection devices, or relays, are disposed at the two ends of said link, said method including the following steps:
 apply a voltage to the relay situated at one of the two ends;
 measure the outward-and-return propagation time;
 phase shift the sinusoidal curves of the current received from the other end, on the basis of the ratio 0.5 outward/ 0.5 return; and
 first test to find out whether a determined time has elapsed;

1) If result of this first test is negative
 phase shift the sinusoidal curves of the current received from the other end, on the basis of the ratio 0.5 outward/ 0.5 return;
 obtain Fresnel diagrams for the current without servocontrolling the phases at the end;
 calculate the differential current and the retained current for each phase;
 second test to find out whether one of the differential currents is in a trip zone;
 provide the differential protection if result of this second test is positive;

2) If result of this first test is positive and if result of the second test is negative:
 Test to compare the phase difference $\Delta\Phi$ between the locally measured current and the current measured remotely, for each phase, with at least one determined value, and optional servocontrol of the phase of each end current at 180° relative to each corresponding local current (step 30).

2. A method according to claim 1 for a two-phase or three-phase network, wherein the first test serves to find out whether the current in each of the phases of the network is found to be out of phase.

3. A method according to claim 1, wherein the predetermined time delay is of the order of 100 ms.

4. A method according to claim 1, wherein the first test serves to find out whether an insulation fault is detected.

5. A method according to claim 1, wherein an alarm is generated if said compensation reaches a first predetermined level.

6. A method according to claim 1, wherein an alarm is generated and the protection apparatus is blocked when the compensation reaches a second predetermined level.

7. Protection apparatus for an electrical link in a medium, high, or very high voltage network, said apparatus including two differential protection devices, or relays, disposed at the two ends of said link, the apparatus including:
 means for applying a voltage to the relay situated at one end of the link;
 means for measuring the outward-and-return propagation time;
 means for phase shifting the sinusoidal curves of the current received from the other end, on the basis of the ratio 0.5 outward/0.5 return;
 first test means for finding out whether a determined time has elapsed;
 means for obtaining Fresnel diagrams for the current without servocontrolling the phases at the other end;
 means for calculating the differential current and the retained current for each phase;
 second test means for finding out whether one of the differential currents is in the trip zone;
 means for providing the differential protection;
 test means for comparing the phase difference $\Delta\Phi$ between the locally measured current and the current measured remotely, for each phase, with at least one determined value, and servocontrol of the phase of each end current at 180° relative to each corresponding local current.

8. Apparatus according to claim 7, further including means for calculating the phase difference between the currents on each phase of said network.

9. Apparatus according to claim 7, further including means for taking a predetermined time delay into account.

10. Apparatus according to claim 9, wherein said predetermined time delay is of the order of 100 ms.

11. Apparatus according to claim 7, further including means for detecting an insulation fault, together with blocking means and means for generating an alarm.

\* \* \* \* \*

UNITED STATES PATENT AND TRADEMARK OFFICE
CERTIFICATE OF CORRECTION

PATENT NO.       : 8,462,476 B2                                                     Page 1 of 1
APPLICATION NO.  : 12/994450
DATED            : June 11, 2013
INVENTOR(S)      : Jean Marmonier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 62 days.

Signed and Sealed this
Eighth Day of September, 2015

Michelle K. Lee
*Director of the United States Patent and Trademark Office*